Dec. 1, 1925.   1,563,769
W. L. MARDEN
REGISTER FOR LIQUID DISPENSING APPARATUS
Filed Nov. 29, 1924
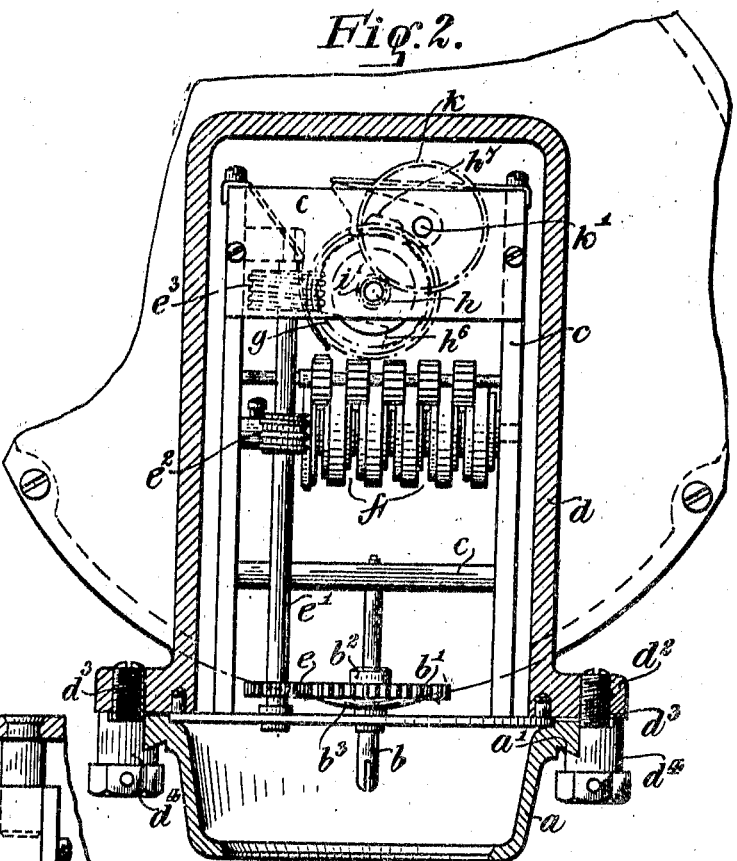
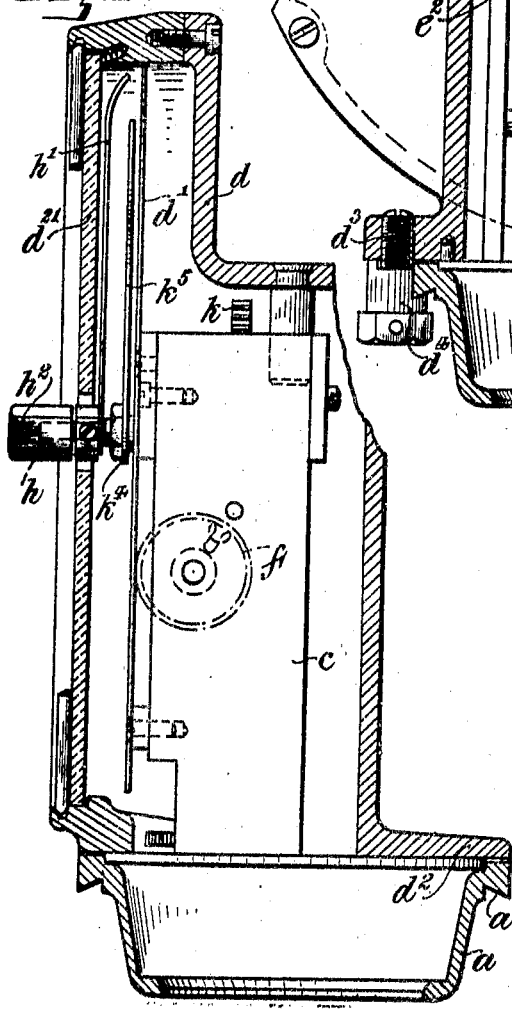
INVENTOR
William L. Marden
BY
Redding, Greeley, O'Shea & Campbell
ATTORNEYS Patented Dec. 1, 1925.

1,563,769

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

REGISTER FOR LIQUID-DISPENSING APPARATUS.

Application filed November 29, 1924. Serial No. 752,837.

*To all whom it may concern:*

Be it known that I, WILLIAM L. MARDEN, a citizen of the United States, residing in the borough of Queens, of the city and State of New York, have invented certain new and useful Improvements in Registers for Liquid-Dispensing Apparatus, of which the following is a specification, reference being had to the accompanying drawing, forming a part hereof.

This invention relates to devices by which the quantity of a liquid dispensed, as at a gasoline filling station, is indicated to the purchaser in units or fractions of units of volume or multiples thereof, while registration is also made, if desired, of the total volume delivered. The improved registering mechanism has been designed with particular reference to its use in connection with a metering device through which the liquid flows and provision has therefore been made whereby the indicating or register face can be turned in any direction with reference to the position of the metering device so that the indication can be read easily by the person concerned. The invention will be described more fully hereinafter with reference to the accompanying drawing in which it is illustrated and in which—

Figure 1 is a view in side elevation of the registering devices, the casing of such devices and the casing of the upper portion of the metering device being shown in section.

Figure 2 is a view of the registering mechanism in elevation as seen from the right hand in Figure 1, with the casing in vertical section.

In the embodiment of the invention illustrated in the drawing there is shown at $a$ a portion of the casing of a disc meter of well known construction with which the improved registering devices are associated and from which they are driven through a shaft $b$ which is in engagement with the metering mechanism to be rotated thereby. The shaft $b$ is mounted in bearings in a frame $c$ which receives and supports the registering mechanism. A casing $d$ encloses the registering mechanism and supports a dial $d'$ for co-operation with the pointers or indicator hands hereinafter referred to. It is desirable that the dial shall be capable of being changed in position according to the point from which it is to be read and therefore that the registering mechanism and its casing shall be capable of being shifted with respect to the meter casing on which it is mounted and that such shifting shall be accomplished without affecting the registering mechanism. Accordingly the circular meter casing $a$ is formed with an undercut circular rim or flange $a'$ upon which the flange $d^2$ of the casing $d$ is seated. Bolts $d^3$ are threaded into the flange $d^2$ from below and receive, between their heads and the flange, sleeves $d^4$ which are notched to engage the undercut flange or rim $a'$. Upon loosening the bolts $d^3$ slightly the casing $d$ can be turned in one direction or the other and then secured in adjusted position by tightening the bolts. It will be seen that unless provision is made to prevent it the registering mechanism might be injured if the casing $d$ is rotated in one direction or that, if the casing is rotated in the opposite direction, the registering mechanism might be actuated without the passage of liquid through the metering device. To make it possible to rotate the casing $d$ without such undesirable results the shaft $b$, through which the registering mechanism is actuated, has mounted frictionally thereon, as between a fixed hub $b^2$ and a friction spring $b^3$, a driving gear $b'$ which meshes with a driven pinion $e$ on the driving shaft $e'$ of the registering mechanism, such driving shaft being mounted in suitable bearings in the frame $c$ eccentrically with respect to the shaft $b$ which is concentric with the casings $a$ and $d$. Therefore, when the casing $d$ is rotated with respect to the casing $a$, the gear $b'$ will be rotated upon the shaft $b$, through its engagement by the pinion $e$, and the registering mechanism will not be actuated nor any undue strain put upon it by reason of such rotation of the casing together with the enclosed registering mechanism.

The shaft $e'$, through a worm and worm gear indicated at $e^2$, drives a totalizing register of ordinary construction indicated at $f$, by which the total number of units of volume of liquid dispensed in successive operations is registered. The shaft $e'$ also carries a worm or skew gear $e^3$ which meshes with a corresponding worm or skew gear $g$ which is mounted frictionally on a shaft $h$. Through a clutch $i'$, preferably a ball clutch, rotation of the shaft in the opposite direction is prevented. In front of the dial $d'$ the shaft $h$ carries the unit pointer or indicator hand $h'$ which makes a complete revolution for each unit of volume of liquid which passes through the metering device, indicating by its position also a fractional part of the unit volume. The shaft $h$ also carries in front of the dial and in front of the protecting glass $d^2$ a knob or handle $h^2$ by which the unit pointer can be turned back to zero position after each operation.

I claim as my invention:

1. In a regulator for liquid dispensing apparatus having a meter, a casing for the meter and registering devices adapted to be actuated by the meter mechanism, a casing for the registering devices rotatably mounted on the meter casing and means to secure the two casings together in relatively adjusted position, and means within the register casing for operatively connecting the registering devices with the meter mechanism adapted to permit relative rotation of the casings without operating the meter mechanism or the registering devices.

2. In a register for liquid dispensing apparatus having a meter casing, registering devices adapted to be actuated by the meter mechanism, and a casing for the registering devices rotatably mounted on the meter casing, the said casings having co-acting flanges, bolts engaging the flange of one of the casings, and notched sleeves interposed between the heads of the bolts and the flange of the other casing and engaging said last mentioned flange.

3. In a register for liquid dispensing apparatus having a meter casing, registering devices adapted to be actuated by the meter mechanism, and a casing for the registering devices rotatably mounted on the meter casing, means to secure the two casings together in relatively adjusted position, a transmitting shaft between the meter mechanism and the registering devices and positioned concentrically with respect to both casings, a driving shaft positioned eccentrically, a pinion on the driving shaft, and a frictionally driven gear mounted on the transmitting shaft and engaging said pinion.

This specification signed this 19th day of November, A. D., 1924.

WILLIAM L. MARDEN.